Patented Jan. 10, 1928.

1,655,692

UNITED STATES PATENT OFFICE.

ERNST FISCHER, HANS HEYNA, AND CARL JOSEF MÜLLER, OF HOCHST-ON-THE-MAIN, GERMANY, ASSIGNORS TO GRASSELLI DYESTUFF CORPORATION, OF NEW YORK, N. Y., A CORPORATION OF DELAWARE.

VIOLET VAT DYESTUFF AND PROCESS OF PREPARING THE SAME.

No Drawing. Application filed February 16, 1927, Serial No. 168,828, and in Germany February 20, 1926.

Our present invention relates to the preparation of new vat dyestuffs of the 2-thionaphthene-2'-indolindigo.

We have found that those dyestuffs of the 2-thionaphthene-2'-indolindigo series, for the synthesis of which are used 3-hydroxy-1-thionaphthenes which are trisubstituted in 4.6.7 position, either by three halogen atoms or by one alkyl group and two halogen atoms or by two alkyl groups and one halogen atom, yield very pure tints and possess excellent properties as to fastness, particularly to boiling with sodium carbonate.

For the preparation of the new dyestuffs the hydroxythionaphthenes thus substituted are condensed with an α-derivative of an isatin, a substitution product or a homologue thereof, for instance isatin-α-anilide, dibromisatin-α-chloride, 5-halogen-7-methyl-isatin-α-anilide or the like.

The above mentioned 3-hydroxythionaphthenes trisubstituted in the 4.6.7-positions may be produced in different ways, for instance by starting from aminobenzenes which are substituted in 2- and 5-position by halogen or alkyl groups or by both an alkyl group and a halogen, and subjecting them to reaction with a sulfur halide and so on, according to the process described in U. S. Patent No. 1,243,170 or, for instance, by starting from the corresponding trisubstituted aminobenzenes, such as 1-amino-2-methyl-3.5-dichlorbenzene or the like, replacing therein the amino group by the thioglycollic acid group and closing the ring to form the hydroxythionaphthene. The condensation of the said hydroxythionaphthenes with the condensable compounds as described and claimed in our present application, is carried out in the usual manner.

The following example serves to illustrate our invention but it is not intended to limit it thereto:

The hydrochloride of 4-chlor-2-amino-1-methylbenzene is converted into the 4-methyl-6.7-dichlor-3-hydroxy-1-thio-naphthene according to the process described in U. S. Patent No. 1,243,170 by way of 1-methyl-2-amino-4.5-dichlorphenyl-3-thioglycollic acid, the inner anhydride of which forms yellow crystals melting at 231–232° C. This hydroxythionaphthene may also be obtained from the 1-methyl-4.5-dichlorbenzene-3-thioglycollic acid by using agents capable of closing the ring. By condensing it with 5.7-dichlorisatin-2-chloride, for instance in chlorobenzene, while heating, the 4-methyl-6.7-dichlor-2-thionaphthene-5'.7'-dichlor-2'-indolindigo having the following graphical formula:

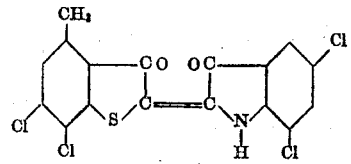

is formed. This compound dissolves in concentrated sulfuric acid to a bluish-green solution and gives a golden-yellow vat dyeing cotton clear reddish violet tints, whose purity and fastness to boiling with sodium carbonate is considerably superior to that of the dyestuffs disclosed in German Patent No. 191,098.

The corresponding dyestuff obtained by starting from 4.6-dichlor-7-methyl-3-hydroxy-1-thionaphthene gives considerably redder dyeings.

We claim:

1. The process of preparing violet vat dyestuffs of the 2-thionaphthene-2'-indolindigo series which consists in condensing an α-derivative of an isatin with compounds of the general formula:

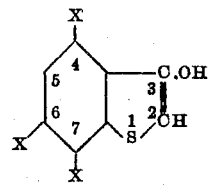

wherein X stands for alkyl or halogen, at least one X being a halogen.

2. The process of preparing violet vat dyestuffs of the 2-thionaphthene-2'-indolindigo series, which consists in condensing an α-derivative of an isatin with 4-methyl-6.7-dihalogen-3-hydroxy-1-thionaphthene.

3. The process of preparing violet vat dyestuffs of the 2-thionaphthene-2'-indolindigo series, which consists in condensing an α-derivative of an isatin with 4-methyl-6.7-dichlor-3-hydroxy-1-thionaphthene.

4. The process of preparing violet vat dyestuffs of the 2-thionaphthene-2'-indolindigo series, which consists in condensing an α-derivative of a halogenated isatin with compounds of the general formula:

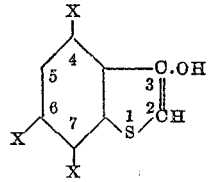

wherein X stands for alkyl or halogen, at least one X being a halogen.

5. The process of preparing violet vat dyestuffs of the 2-thionaphthene-2'-indolindigo series, which consists in condensing an α-derivative of a halogenated isatin with 4-methyl-6.7-dihalogen-3-hydroxy-1-thionaphthene.

6. The process of preparing violet vat dyestuffs of the 2-thionaphthene-2'-indolindigo series, which consists in condensing an α-derivative of a halogenated isatin with 4-methyl 6.7 - dichlor-3-hydroxy - 1 - thionaphthene.

7. The process of preparing violet vat dyestuffs of the 2-thionaphthene-2'-indolindigo series, which consists in condensing a 5.7 - dichlorisatin - α - derivative with compounds of the general formula:

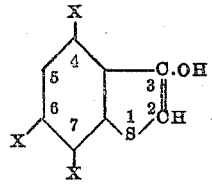

wherein X stands for alkyl or halogen, at least one X being a halogen.

8. The process of preparing violet vat dyestuffs of the 2-thionaphthene-2'-indolindigo series, which consists in condensing a 5.7-dichlorisatin-α-derivative with 4-methyl-6.7-dihalogen-3-hydroxy-1-thionaphthene.

9. The process of preparing violet vat dyestuffs of the 2-thionaphthene-2'-indolindigo series, which consists in condensing a 5.7-dichlorisatin-α-derivative with 4-methyl-6.7-dichlor-3-hydroxy-1-thionaphthene.

10. As new compounds, violet vat dyestuffs of the general formula:

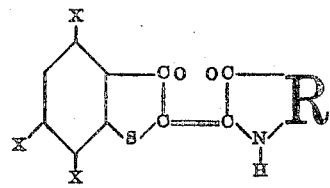

wherein X stands for alkyl or halogen, at least one X being a halogen and wherein R means an arylene residue substituted or not, which dyestuffs are of very great purity and fastness.

11. As new compounds, violet vat dyestuffs of the general formula:

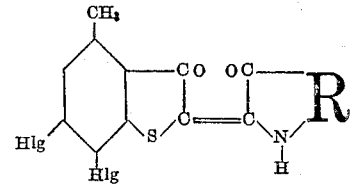

wherein R means an arylene residue substituted or not.

12. As new compounds, violet vat dyestuffs of the general formula:

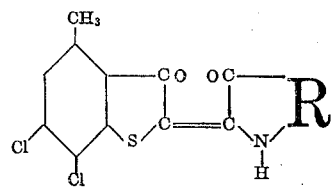

wherein R means an arylene residue substituted or not.

13. As new compounds, violet vat dyestuffs of the general formula:

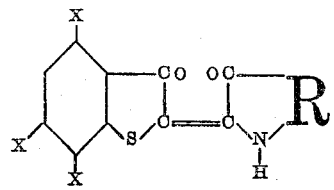

wherein X stands for alkyl or halogen, at least one X being a halogen and wherein R means a halogenated arylene residue.

14. As new compounds, violet vat dyestuffs of the general formula:

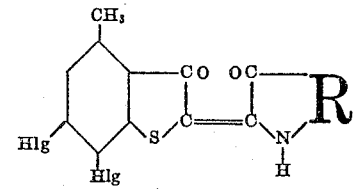

wherein R means a halogenated arylene residue.

15. As new compounds, violet vat dyestuffs of the general formula:

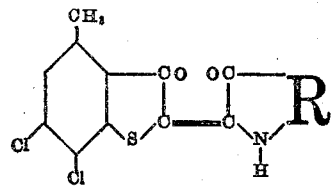

wherein R means a halogenated arylene residue.

16. As new compounds, violet vat dyestuffs of the general formula:

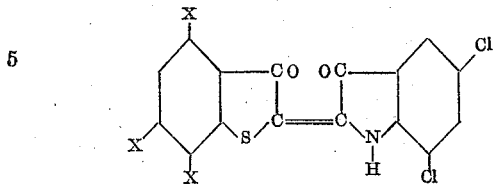

wherein X stands for alkyl or halogen but at least one X is a halogen.

17. As new compounds, violet vat dyestuffs of the general formula:

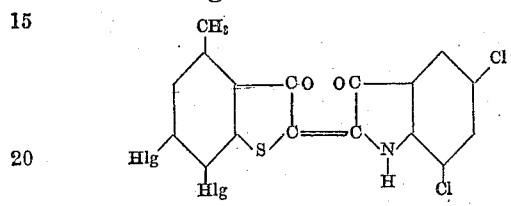

18. As a new compound, the violet vat dyestuff of the formula:

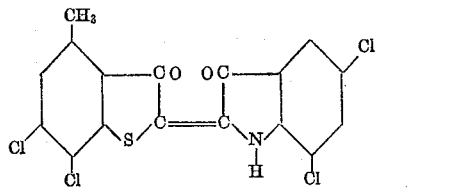

which dyestuff dissolves in concentrated sulfuric acid to a bluish-green solution, giving a golden-yellow vat which dyes cotton clear reddish-violet tints of great purity and fastness to boiling with sodium carbonate.

In testimony whereof, we affix our signatures.

ERNST FISCHER.
HANS HEYNA.
CARL JOSEF MÜLLER.